(12) United States Patent
Azar et al.

(10) Patent No.: US 11,920,565 B2
(45) Date of Patent: Mar. 5, 2024

(54) METHOD FOR COMPUTER-IMPLEMENTED DETERMINATION OF CONTROL PARAMETERS FOR WIND TURBINES

(71) Applicant: Siemens Gamesa Renewable Energy A/S, Brande (DK)

(72) Inventors: Ziad Azar, Sheffield (GB); Richard Clark, Sheffield (GB); Alexander Duke, Sheffield (GB); Stuart Logan, Glasgow (GB); Arwyn Thomas, Breaston (GB); Zhan-Yuan Wu, Sheffield (GB)

(73) Assignee: Siemens Gamesa Renewable Energy A/S (DE)

( * ) Notice: Subject to any disclaimer, the term of this patent is extended or adjusted under 35 U.S.C. 154(b) by 82 days.

(21) Appl. No.: 17/633,331

(22) PCT Filed: Aug. 3, 2020

(86) PCT No.: PCT/EP2020/071823
§ 371 (c)(1),
(2) Date: Feb. 7, 2022

(87) PCT Pub. No.: WO2021/028252
PCT Pub. Date: Feb. 18, 2021

(65) Prior Publication Data
US 2022/0356869 A1 Nov. 10, 2022

(30) Foreign Application Priority Data
Aug. 14, 2019 (EP) ...................................... 19191763

(51) Int. Cl.
*F03D 7/04* (2006.01)
*F03D 15/00* (2016.01)

(52) U.S. Cl.
CPC .............. *F03D 7/048* (2013.01); *F03D 15/00* (2016.05); *F05B 2270/32* (2013.01); *F05D 2220/76* (2013.01)

(58) Field of Classification Search
CPC .......... F03D 7/048; F03D 15/00; F03D 7/045; F03D 7/047; F03D 7/028; F05B 2270/32;
(Continued)

(56) References Cited

U.S. PATENT DOCUMENTS

2011/0224926 A1 9/2011 Morjaria et al.
2017/0328346 A1 11/2017 Kelvin et al.
(Continued)

FOREIGN PATENT DOCUMENTS

| GB | 2 477 968 A | | 8/2011 | |
| GB | 2477968 A | * | 8/2011 | ............. F03D 7/046 |

OTHER PUBLICATIONS

International Search Report & Written Opinion for PCT/EP2020/071823 dated Nov. 10, 2020.

*Primary Examiner* — Jacob M Amick
*Assistant Examiner* — Charles J Brauch
(74) *Attorney, Agent, or Firm* — Schmeiser, Olsen & Watts, LLP

(57) ABSTRACT

A method for determining improved control parameters of a number of wind turbines of a wind park is provided. The method considers the impact of individual turbine manufacturing tolerances on the turbine performance, thereby avoiding under-utilization of those wind turbines. The method includes the steps of: receiving, by an interface, one or more actual manufacturing tolerances of characteristic values for each of the number of wind turbines; determining, by a processing unit, for each of the number of wind turbines a power versus wind speed map which is calculated from a given turbine model with the one or more actual manufac-
(Continued)

turing tolerances of the respective wind turbines as input parameters; and deriving, by the processing unit, the control parameters for each of the number of wind turbines from their associated power versus wind speed map.

10 Claims, 2 Drawing Sheets

(58) Field of Classification Search
CPC .............. F05B 2260/84; F05B 2270/20; F05B 2270/305; F05B 2270/802; F05D 2220/76; Y02E 10/72; Y02P 70/50
See application file for complete search history.

(56) References Cited

U.S. PATENT DOCUMENTS

| | | |
|---|---|---|
| 2018/0171979 A1 | 6/2018 | Spruce |
| 2019/0203693 A1 | 7/2019 | Tiwari et al. |

* cited by examiner

METHOD FOR COMPUTER-IMPLEMENTED DETERMINATION OF CONTROL PARAMETERS FOR WIND TURBINES

CROSS-REFERENCE TO RELATED APPLICATIONS

This application claims priority to PCT Application No. PCT/EP2020/071823, having a filing date of Aug. 3, 2020, which claims priority to EP Application No. 19191763.2, having a filing date of Aug. 14, 2019, the entire contents both of which are hereby incorporated by reference.

FIELD OF TECHNOLOGY

The following relates to a method and a system for computer-implemented determination of improved control parameters of a number of wind turbines of a wind park.

BACKGROUND

The operation of wind turbines (short: turbines) is based on nominal parameters of the wind turbine which characterize the wind turbines in terms of power output in dependency of wind speed. Using the nominal parameters enables the manufacturer of the wind turbine to guarantee specific annual energy production (AEP) to customers as the wind turbines are treated as having identical performance over its contractual wind-speed power curve and rated power point.

The nominal parameters therefore are used as a basis to derive turbine control parameters with regard to a specific power output at a specific ambient condition, in particular wind speed. As the AEP can be regarded as a measure indicating the performance and/or efficiency of a turbine, it would be desirable to be able to adapt the control parameters in a way to increase the AEP as much as possible without damaging effects for the turbine or reducing its lifetime.

The same problems arise in other industrial processes, such as the operation of gas turbines.

SUMMARY

An aspect relates to a method and a system for computer-implemented determination of improved control parameters of a number of wind turbines of a wind park. It is a further aspect of embodiments of the present invention to provide a computer program product (non-transitory computer readable storage medium having instructions, which when executed by a processor, perform actions).

According to a first aspect of embodiments of the present invention, a method for computer-implemented determination of improved control parameters of a number of wind turbines of a wind park is suggested. The number of wind turbines of the wind park may be arbitrary. If the number of wind turbines equals one, the wind park corresponds to a single wind turbine. If the number of wind turbines is greater than one, the wind turbines desirably are arranged in proximity to each other, to supply the total produced power at a single point to an energy grid.

The method comprises the steps of receiving, by an interface, one or more manufacturing tolerances of actual characteristic values for each of the number of wind turbines; determining, by a processing unit, for each of the number of wind turbines a power versus wind speed map which is calculated from a given turbine model with the one or more actual manufacturing tolerances of the respective wind turbines as input parameters; and deriving, by the processing unit, the control parameters for each of the number of wind turbines from their associated power versus wind speed map.

In embodiments of the present invention the term "actual manufacturing tolerances" is to be understood as actual or achieved parameters within manufacturing tolerance ranges.

The method is based on the consideration that there may be an under-utilization of the wind turbines due to a lack of consideration of the impact of individual turbine manufacturing tolerances on its turbine performance. Considering suitable manufacturing tolerances for each wind turbine enables forming a tailored turbine "DNA" which can be regarded as a unique map of characterizing turbine parameters. Having knowledge about manufacturing tolerances of each wind turbine, a given turbine model can be fed with the manufacturing tolerances to determine whether a specific wind turbine is able to produce more power compared to only considering nominal parameters. The determination whether or not a turbine is able to be controlled with improved control parameters to calculate its theoretical power output at a given wind speed will be derived from the associated power versus wind speed map which can be derived from the output of the given turbine model which processes the one or more actual manufacturing tolerances of the respective wind turbines as input parameters.

Hence, the actual or achieved manufacturing tolerances are considered in a turbine model to derive actual turbine specific control parameters from an associated power versus wind speed map.

Where the actual parameters within a tolerance range of a specific wind turbine are, for example, better than the nominal parameters on which they are ordinarily operated, it is possible—while providing a safe mechanism without damaging the wind turbine—of making use of this additional margin resulting in higher AEP levels. Hence, considering the manufacturing tolerances allows an operation of the wind turbines in an optimized manner based on its DNA.

According to an embodiment, the turbine model is a physical model which is based on a number of equations found by simulations and/or validated test data and/or look-up tables. The turbine model may, in addition, consider a number of measured performance parameters, such as temperatures, current load profile, etc. to determine the power versus wind speed map for a specific wind turbine.

The one or more actual manufacturing tolerances may be received, by the interface, from a database. The interface and the processing unit are part of a computer system. The computer system may be part of a controlling instance of the wind turbine. Alternatively, the computer system may be part of an external controlling system. The database may be stored on that computer system or may be an external database connected to the computer system. The one or more actual manufacturing tolerances may be obtained by measurement during the manufacturing process and collated, for each of the number of wind turbines, in the database.

The one or more characteristic values of a specific wind turbine: an airgap (between a rotor and a stator), a magnet performance, a magnet dimension, a thermal conductivity, and a coil resistance. In addition to the characteristic values, further characteristic values may be considered as well, such as a magnet material, a thermal performance of the coil, variations of coil segments and so on.

According to a further embodiment, as further input parameters of the turbine model current and/or historical turbine sensor data and/or historical operating conditions are processed for determining, by the processing unit, for each of the number of wind turbines, the power versus wind speed map. Considering current and/or historical sensor data captured by physical and/or virtual sensors enables to receive information about the behavior of components with respect to lifetime considerations. Current and/or historical sensor data to be considered may consist of ambient temperatures, wind speed, among others. The historical data may be compared with real-time sensor data during the operation of a specific wind turbine. A comparison of measured lifetime data with those resulting from the turbine model allows for a flexible exploitation of generous manufacturing margins to push the turbines harder and thus increase AEP. Furthermore, health monitoring features can be gained through the comparison measured sensor data against those predicted by the turbine model.

According to a further embodiment, the turbine model considers a drive train consisting of a rotor hub, a generator, a converter, and a transformer of the wind turbine. In addition, or alternatively, the turbine model may consider blades and/or gearbox and/or nacelle and/or tower and/or cable and/or a transformer of a specific wind turbine.

According to a second aspect of embodiments of the present invention, a computer program product directly loadable into the internal memory of a digital computer is suggested, comprising software code portions for performing the steps of the method described herein when the product is run on a computer. The computer program product may be in the form of a storage medium, such as a CD-ROM, DVD, USB-stick or a memory card. The computer program product may also be in the form of a signal which is transferable via a wired or wireless communication line.

According to a third aspect, a system for computer-implemented determination of improved control parameters of a number of wind turbines of a wind park is suggested. The system comprises an interface which is adapted to receive one or more actual manufacturing tolerances of characteristic values for each of the number of wind turbines, and a processing unit which is adapted to determine, for each of the number of wind turbines, a power versus wind speed map which is calculated from a given turbine model with one or more actual manufacturing tolerances of the respective wind turbines as input parameters, and derive the control parameters for each of the number of wind turbines from their associated power versus wind speed map.

BRIEF DESCRIPTION

Some of the embodiments will be described in detail, with reference to the following figures, wherein like designations denote like members, wherein.

DETAILED DESCRIPTION

Figure 1:
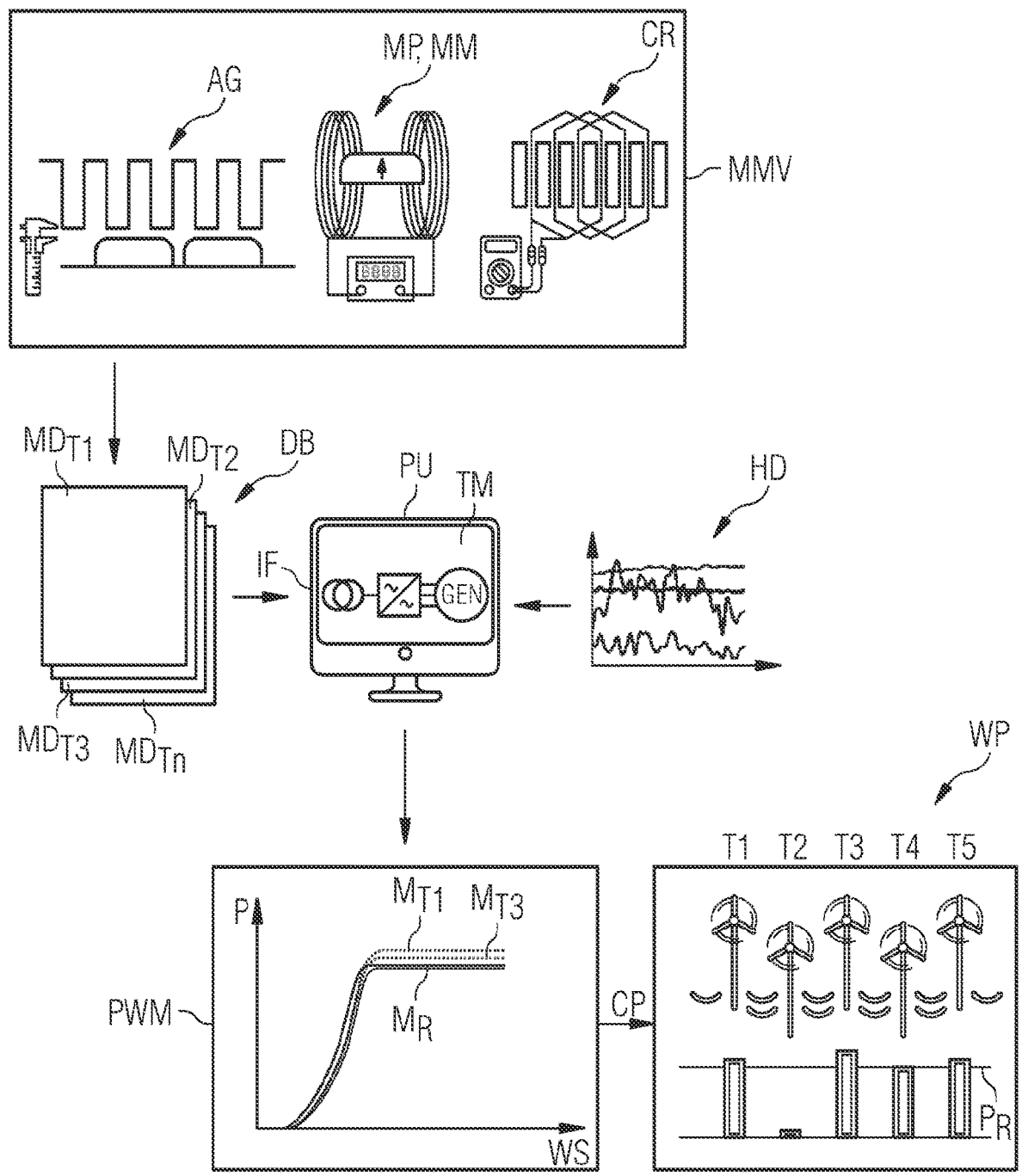
FIG. 1 shows a schematic diagram illustrating the steps for carrying out the method for determination of improved control parameters of a number of wind turbines of a wind park.

FIG. 1 shows a schematic diagram illustrating the steps to determine improved control parameters of a number of wind turbines of a wind park according to an embodiment of the invention. Although the below described example refers to a wind park with a plurality of wind turbines, it is to be understood, that the number of wind turbines may be arbitrary. The number of wind turbines may be one (1), i.e., the wind park corresponds to a single wind turbine. If the number of wind turbines is greater than one, the wind turbines desirably are arranged in proximity to each other, to supply the total produced power at a single point to an energy grid.

The method considers the impact of individual turbine manufacturing tolerances on the turbine performance, thereby avoiding under-utilization of those wind turbines. Due to the consideration of individual turbine manufacturing tolerances, at least some of them are able to be operated in an optimized manner resulting in an increasing AEP of the wind park.

Referring to FIG. 1, in a first or preparing step, measurement of manufacturing data MMV is executed. Manufacturing tolerances having an impact on the turbine performance are, for example, an airgap AG, a magnet performance MP (as a result of the magnet material and/or dimensions MDM and/or manufacturing processes), thermal conductivity TC, and coil resistance CR. Each of these manufacturing tolerances are characteristic values which are individual for each turbine to be considered. The manufacturing tolerances of these characteristic values AG, MP, MDM, TC, CR do have an immediate impact on the turbine performance.

The manufacturing tolerances, typically different for every turbine (turbine DNA), of the characteristic values AG, MP, MDM, TC, CR are collated and stored in a database DB. For each turbine T1, ..., Tn (where n corresponds to the number of wind turbines in the wind park), a manufacturing dataset $MD_{T1}, ..., MD_{Tn}$ may be stored containing the characteristic values AG, MP, MDM, TC, CR. The manufacturing dataset $MD_{T1}, ..., MD_{Tn}$ may be regarded as DNA of each individual wind turbine T1, ..., Tn. It is to be understood that, for embodiments of the present invention, storing of manufacturing data consisting of the manufacturing tolerances of characteristic values AG, MP, MDM, TC, CR may be made in any way, such as a lookup-table, associated maps, etc.

The manufacturing tolerances of the characteristic values AG, MP, MDM, TC, CR are received at the interface IF of a computer or computer system. The computer or computer system comprises the processing unit PU. The database DB may be stored in a memory of the computer (system) or an external storage of the computer (system). The database DB may be cloud based in another implementation. The processing unit PU is adapted to determine, for each of the number of wind turbines T1, ..., Tn, a power versus wind speed map $M_{T1}, ..., M_{Tn}$. The power versus wind speed map $M_{T1}, ..., M_{Tn}$ is calculated from a given turbine model with the manufacturing tolerances of the characteristic values AG, MP, MDM, TC, CR of the respective wind turbines T1, ..., Tn as input parameters.

For each type of wind turbine, a specific turbine model may be provided. In an alternative embodiment, a specific turbine model may be used for a respective wind turbine of the wind park. In a further alternative embodiment, a common turbine model may be used for all wind turbines of the wind park.

The turbine model is a physical model which is based on a number of equations found by simulations and/or validated test data and/or look-up tables. The turbine model can be regarded as a "digital twin" for each individual wind turbine. The power versus wind speed maps $M_{T1}, ..., M_{Tn}$ of each individual wind turbine T1, ..., Tn are unique maps resulting from the turbine model and the manufacturing tolerances of the characteristic values AG, MP, MDM, TC, CR.

Figure 2:
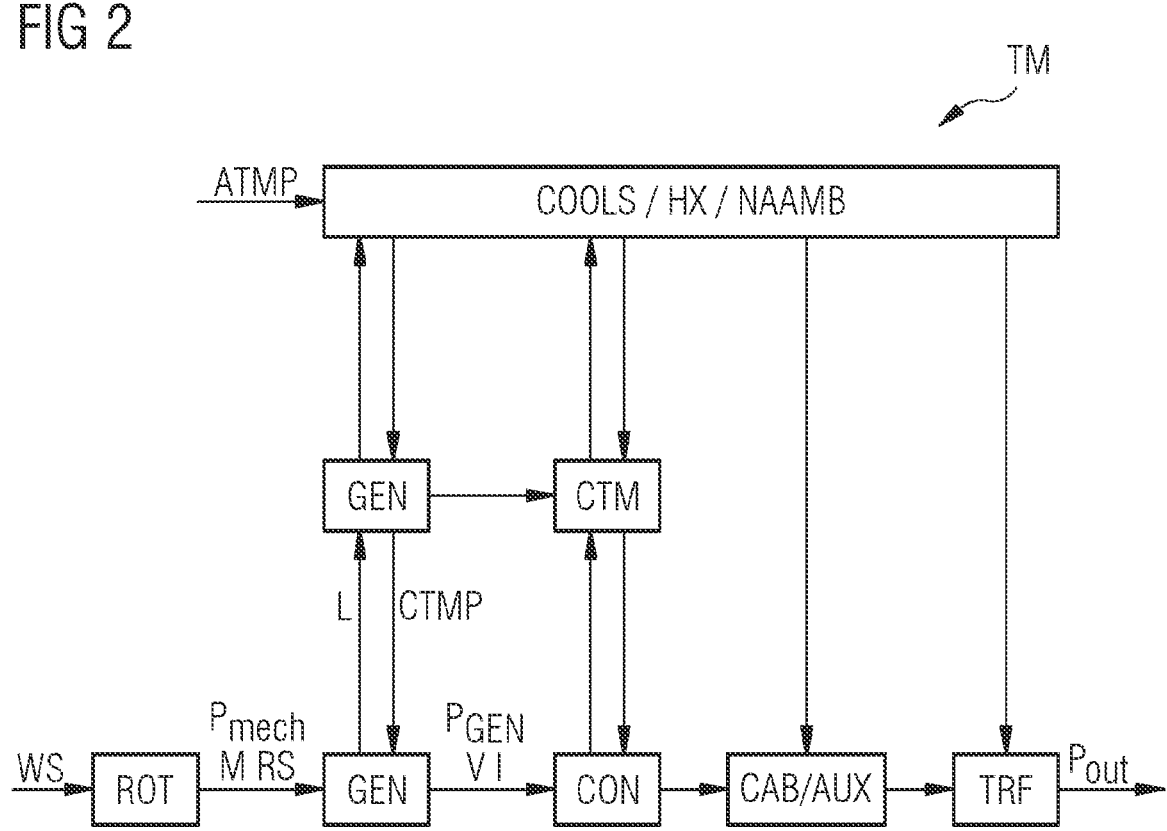
FIG. 2 illustrates a schematic diagram illustrating a turbine model which is used to determine improved control parameters of a wind turbine.

FIG. 2 illustrates an embodiment of the turbine model TM used to model an individual wind turbine. In this embodiment, the turbine model TM considers an electrical drive train of the wind turbines consisting of a rotor hub ROT, a generator GEN, a converter CON, cables CAB and auxiliary/ancillary components AUX, and a transformer TRF. However, the turbine model TM can also consider further components of the wind turbine, such as blades, nacelle, tower, sub-stations, gearbox (for geared-drive turbine) and so on.

The turbine model TM calculates the losses of components within the drive train to account for the loss in power/energy between the turbine blade input and the output to grid during the electromechanical energy conversion and ancillary or supporting systems. As the loss mechanisms are temperature dependent and themselves generate heat, the turbine model TM is coupled or includes a thermal model for the generator GEN (generator thermal model GTM) and/or a thermal model for the converter CON (converter thermal model CTM) and is solved iteratively. The generator thermal model GTM and the converter thermal model CTM are coupled to components affecting the cooling of the drive train, such as cooling system COOLS (e.g., cooling fans), heat exchanger HX, and nacelle ambient NAAMB.

The turbine model TM calculates the available power $P_{out}$ at the (grid) output based on the input ambient conditions of wind speed WS and temperature ATMP. The turbine model TM can be used to assess the potential AEP for a given wind turbine and site by inputting current, historical, and/or predicted wind conditions over a given period of time. The use of the thermal models GTM, CTM allows for any control features such as high temperature curtailment to be accounted for accurately. Alternatively, the turbine model TM can be employed in real time to assess the potential output and/or impact of control decisions on a specific generator operating point. Furthermore, it may be used as reference against the actual turbine comparing actual and predicted operation in response to the operating conditions to act as a health monitor.

The inclusion of a thermal model allows components to be operated close to maximum permissible/safe limits without the need for large safety factors.

The turbine model TM can be implemented in a number of different environments/programming codes. Typically, it may be based on iterative solver routines to handle both thermal coupling and control algorithms. Where possible, reduced order models, look-up tables or functions (equations) are used to represent complex behaviors using suitable approximations and/or assumptions to ensure short computation times whilst maintaining a suitable level of accuracy.

The turbine model TM, as shown in FIG. 2, may be extended to include blade models or structural models of the turbine. Such a model can be used to represent any electrical drive/generator system beyond the wind turbine.

More detailed the turbine model TM includes the following sub-models:

A rotor model for modelling the rotor ROT by converting wind speed WS into a rotor/blade rotational speed RS and mechanical power $P_{mech}$ (i.e. input torque M).

An optional bearing model for modelling the bearing by accounting for non-ideal main bearings and hence power loss.

A generator model for modelling the generator GEN by considering the main mechanical to electrical energy conversion accounting for the torque capability, voltage production and losses incurred in conversion: This may be implemented by a numerical computation of the electromagnetic performance (e.g. Finite Element Analysis), an analytical model, or a hybrid of these which uses a Reduced Order Model (ROM) in which the generator performance is derived through a-priori numerical modelling and distilled into simpler functions or look-up tables. The generator model is also adapted to calculate losses incurred in the conversion such as winding copper losses and stator electrical steel iron losses. It accounts for control decisions.

A converter model for modelling the converter CON: for example, in a direct drive permanent magnet generator the variable frequency output of the generator is interfaced with the fixed frequency grid via a power electronic converter (active rectifier—DC link—inverter) which allows for control of the generator operating conditions. The load dependent switching and conduction losses in the converter are accounted for.

A cable loss model for modelling the cables CAB by consideration of Ohmic losses in connections cables.

An auxiliary/ancillary loss model for modelling auxiliary/ancillary components AUX by accounting for power consumed by supporting services such as cooling fans, pumps and hydraulic control systems as these losses detract from the available power at the grid.

A transformer loss model for modelling the transformer TRF by accounting for Ohmic winding losses and core losses which are dependent on load conditions.

Thermal models of the generator GEN and the converter CON: The performance and losses of the above components are temperature dependent. For example, the resistance and hence copper losses produced by the stator electrical windings increase due to the copper resistivity dependence on temperature and the flux produced by a permanent magnet (the field source in the generator) varies due to changes in the material remanence with temperature. As the losses themselves increase component temperature the above loss models are calculated iteratively with respective thermal model. As with the generator model, this may be implemented by a Reduced Order model using parameters derived from numerical modelling e.g., CFD and Thermal FEA to create an equivalent circuit or lumped parameter network.

A number of maps $M_R$, $M_{T1}$ and $M_{T3}$ resulting from the turbine model TM is illustrated in the P-WS-diagram (power versus wind speed map PWM). In this diagram, a map $M_R$ of a wind turbine which is calculated based on nominal parameters (characteristic values) and two maps $M_{T1}$ and $M_{T3}$ for turbines T1, T3 are illustrated. By way of example only, the maps $M_{T1}$ and $M_{T3}$ of the turbines T1, T3 show that (at least some of) the actual parameters of the characteristic values AG, MP, MDM, TC, CR are different from that of the nominal turbine resulting in an additional power P for a given speed WS.

Based on their associated power versus wind speed maps control parameters CP can be derived for each individual turbine which are used for controlling the wind turbines. In the illustration of FIG. 1, the wind park consists of five turbines T1, ..., T5. The actual power output P1, ..., P5 in relation to a rated output $P_R$ of a turbine with nominal characteristic values is indicated below the turbines T1, ..., T5. As can easily be seen, turbines T1, T3 and T5 are capable of generating a power output P1, P3, P5 which is above the rated output of a turbine with nominal characteristic values. By pushing turbines T1, T3, T5 harder, the reduced production of turbine T2, which is, for example down for maintenance or an error, can be compensated at least partially. Power output P4 of wind turbine T4 corresponds to the rated output of a turbine with nominal characteristic values. This means, that the manufacturing tolerances of wind turbine T4 is within the specification but not better.

Consideration of the impact of individual turbine manufacturing tolerances on the turbine performance and using them in a turbine model for each individual turbine allows for maximizing of an AEP through a wind park optimization by operating the turbines in an optimized manner at each location based on its individual turbine performance.

If the actual parameters within a manufacturing tolerance band of a specific turbine are better than the nominal data on which they are ordinary operated, the turbine model TM can provide a safe mechanism of making use of this additional margin with the result of producing higher AEP levels.

Comparing measured lifetime data in the form of historical data AD which are received from the processing unit in addition to the manufacturing data allows for a flexible exploitation of generous manufacturing margins to push the turbines harder and thus increase AEP. In addition, the processing unit PU is able to incorporate health monitoring features through a comparison of measured parameters, such as component temperatures against those which may be predicted by the turbine model TM.

The comparison of physical turbine data can be made with the associated turbine model TM to monitor situations where the turbine may be underperforming as well as providing possible insight into reasons of an underperforming. The comparison can flag potential issues and call for servicing as well as providing learning for future turbine development.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented determination of improved control parameters of a number of wind turbines of a wind park, the method comprising:
    S1) receiving, by an interface, one or more achieved parameters within a manufacturing tolerance range of characteristic values for each of the number of wind turbines;
    S2) determining, by a processing unit, for each of the number of wind turbines a power versus wind speed map which is calculated from a given turbine model with the one or more achieved parameters within the manufacturing tolerance range of the respective wind turbines as input parameters; and
    S3) deriving, by the processing unit, the control parameters for each of the number of wind turbines from their associated power versus wind speed map.

2. The method according to claim 1, wherein the turbine model is a physical model which is based on a number of equations found by simulations and/or validated test data and/or look-up tables.

3. The method according to claim 1, wherein the one or more achieved parameters within the manufacturing tolerance range are received, by an interface, from a database.

4. The method according to claim 1, wherein the one or more achieved parameters within the manufacturing tolerance range are obtained by measurement.

5. The method according to claim 1, wherein the one or more characteristic values includes one or more of:
    an airgap;
    a magnet performance;
    a magnet dimension;
    a thermal conductivity; and
    a coil resistance.

6. The method according to claim 1, wherein as further input parameters of the given turbine model historical turbine sensor data and/or operating conditions are processed for determining, by the processing unit, for each of the number of wind turbines, the power versus wind speed map.

7. The method according to claim 1, wherein the given turbine model considers a drive train consisting of a rotor hub, a generator, a converter, and a transformer of the wind turbine.

8. The method according to claim 1, wherein the given turbine model considers blades and/or nacelle and/or gearbox and/or tower and/or cable and/or a transformer of the wind turbine.

9. A computer program product, comprising a computer readable hardware storage device having computer readable program code stored therein, said program code executable by a processor of a computer system to implement a method directly loadable into the internal memory of a digital computer, comprising software code portions for performing the steps of claim 1 when the product is run on a computer.

10. A system for computer-implemented determination of improved control parameters of a number of wind turbines of a wind park, comprising an interface configured to:
    receive one or more achieved parameters within a manufacturing tolerance range of characteristic values for each of the number of wind turbines; and
    a processing unit configured to:
        determine, for each of the number of wind turbines, a power versus wind speed map which is calculated from a given turbine model with the one or more achieved parameters within the manufacturing tolerance range of the respective wind turbines, as input parameters; and
        derive the control parameters for each of the number of wind turbines from their associated power versus wind speed map.

* * * * *